(12) United States Patent
Bodendorf et al.

(10) Patent No.: US 10,836,389 B2
(45) Date of Patent: Nov. 17, 2020

(54) START-STOP DEVICE FOR COMMENCING AN AUTOMATIC SWITCH-OFF PROCESS OF A DRIVE MACHINE

(71) Applicant: Bayerische Motoren Werke Aktiengesellschaft, Munich (DE)

(72) Inventors: Frank Bodendorf, Kaufering (DE); Daniela Treutler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 263 days.

(21) Appl. No.: 15/824,469

(22) Filed: Nov. 28, 2017

(65) Prior Publication Data

US 2018/0079417 A1 Mar. 22, 2018

Related U.S. Application Data

(63) Continuation of application No. PCT/EP2016/058547, filed on Apr. 18, 2016.

(30) Foreign Application Priority Data

May 29, 2015 (DE) .................... 10 2015 209 973

(51) Int. Cl.
*B60W 10/196* (2012.01)
*B60W 30/18* (2012.01)
*F02N 11/08* (2006.01)

(52) U.S. Cl.
CPC ... *B60W 30/18018* (2013.01); *F02N 11/0822* (2013.01); *B60W 2510/1005* (2013.01);
(Continued)

(58) Field of Classification Search
CPC ... B60W 30/18018; B60W 2510/1005; B60W 2520/10; B60W 2540/12; F02N 11/0822;
(Continued)

(56) References Cited

U.S. PATENT DOCUMENTS

| | | | | |
|---|---|---|---|---|
| 8,579,764 B2 * | 11/2013 | Morita | ............... | B60W 10/02 477/173 |
| 8,606,485 B1 * | 12/2013 | Ando | ................... | B60W 10/06 701/102 |

(Continued)

FOREIGN PATENT DOCUMENTS

| CN | 102165179 A | 8/2011 |
|---|---|---|
| CN | 102418611 A | 4/2012 |

(Continued)

OTHER PUBLICATIONS

Chinese Office Action issued in Chinese counterpart application No. 201680022229.2 dated May 21, 2018, with English translation (Fifteen (15) pages).

(Continued)

*Primary Examiner* — Masud Ahmed
(74) *Attorney, Agent, or Firm* — Crowell & Moring LLP

(57) ABSTRACT

A start-stop device for commencing an automatic switch-off process of a drive machine in a motor vehicle includes means for detecting a first trigger condition for initiating an automatic switch-off process, means for detecting a second trigger condition for initiating an automatic switch-off process if the first trigger condition can no longer be met, and means for initiating an automatic switch-off process of the drive machine if the first trigger condition or the second trigger condition is met.

17 Claims, 2 Drawing Sheets

(52) U.S. Cl.
CPC ..... *B60W 2520/10* (2013.01); *B60W 2540/12* (2013.01); *F02N 2200/0801* (2013.01); *F02N 2200/0802* (2013.01); *F02N 2200/0806* (2013.01); *F02N 2200/0808* (2013.01); *F02N 2200/102* (2013.01); *F02N 2200/125* (2013.01); *Y02T 10/48* (2013.01)

(58) Field of Classification Search
CPC ....... F02N 2200/0801; F02N 2200/102; F02N 2200/0802; F02N 2200/0806; F02N 2200/125; F02N 2200/0808; Y02T 10/48
See application file for complete search history.

(56) References Cited

U.S. PATENT DOCUMENTS

| | | | | |
|---|---|---|---|---|
| 9,200,576 B2* | 12/2015 | Iijima | ...................... | B60K 6/48 |
| 9,366,216 B2* | 6/2016 | Be | ...................... | B60W 50/085 |
| 9,388,750 B2* | 7/2016 | Be | ........................... | F02D 29/02 |
| 2012/0077640 A1* | 3/2012 | Saito | ........................ | F02D 17/02 |
| | | | | 477/183 |
| 2014/0005914 A1* | 1/2014 | Bernzen | .............. | F02N 11/0833 |
| | | | | 701/112 |
| 2015/0192081 A1* | 7/2015 | Ranspach | ........... | F02D 41/1456 |
| | | | | 60/274 |
| 2019/0001982 A1* | 1/2019 | Meinhard | ....... | B60W 30/18018 |

FOREIGN PATENT DOCUMENTS

| | | |
|---|---|---|
| CN | 103958942 A | 7/2014 |
| DE | 100 23 331 A1 | 6/2001 |
| DE | 100 35 049 A1 | 1/2002 |
| DE | 103 12 390 A1 | 10/2004 |
| DE | 10 2004 024 212 A1 | 12/2005 |
| DE | 10 2008 031 341 A1 | 1/2010 |
| DE | 10 2008 061 790 A1 | 7/2010 |
| DE | 10 2010 000 615 A1 | 9/2010 |
| DE | 10 2008 061 791 A1 | 11/2010 |
| DE | 10 2006 029 715 B4 | 9/2012 |
| DE | 10 2011 007 716 A1 | 10/2012 |
| DE | 10 2014 206 509 A1 | 10/2014 |
| EP | 1 028 022 A2 | 8/2000 |
| EP | 2 787 201 A1 | 10/2014 |

OTHER PUBLICATIONS

PCT/EP2016/058547, International Search Report dated Aug. 24, 2016 (Two (2) pages).
German Office Action issued in German counterpart application No. 10 2015 209 973.3 dated Mar. 15, 2016 (Five (5) pages).

* cited by examiner

START-STOP DEVICE FOR COMMENCING AN AUTOMATIC SWITCH-OFF PROCESS OF A DRIVE MACHINE

CROSS REFERENCE TO RELATED APPLICATIONS

This application is a continuation of PCT International Application No. PCT/EP2016/058547, filed Apr. 18, 2016, which claims priority under 35 U.S.C. § 119 from German Patent Application No. 10 2015 209 973.3, filed May 29, 2015, the entire disclosures of which are herein expressly incorporated by reference.

BACKGROUND AND SUMMARY OF THE INVENTION

The invention relates to a start-stop device for commencing an automatic switch-off and/or switch-on process of a drive machine in a motor vehicle.

At present, internal combustion engines are normally manually switched off by means of an ignition key or by actuation of an operating element by the driver. One exception is constituted by a method which is proposed in DE 100 23 331 A1. Here, instead of the ignition key, the brake pedal position or the brake pedal pressure is evaluated. The switch-off process of the internal combustion engine is commenced if, after the standstill state of the motor vehicle has been attained, the brake pedal in its already actuated position is actuated with greater intensity. For onward travel, the brake pedal is released, and the accelerator pedal is depressed, following which a start of the internal combustion engine is initiated. A disadvantage of such methods is that the motor vehicle driver alone is responsible for the switch-off of the internal combustion engine. Analysis of modern driving behavior shows that, despite increased environmental awareness and increased fuel prices, a manual switch-off of the internal combustion engine, for example at traffic signals, is seldom performed by a driver of his or her own accord.

To reduce fuel consumption and pollutant emissions, in vehicles, use is already made of systems which automatically switch off the internal combustion engine of a motor vehicle under certain prerequisites or in the presence of predefined switch-off conditions and which automatically switch the internal combustion engine on again in the presence of predefined switch-on conditions. Such methods and systems or start-stop devices are suitable in particular for urban traffic for the purposes of reducing fuel consumption, because, in urban traffic, the vehicle often comes to a standstill at traffic signals or owing to the traffic, and the operation of the internal combustion engine is not necessary.

At present, individual vehicle manufacturers implement different switch-off and switch-on logics with different advantages. For example, vehicles with automatic transmissions are on the market in the case of which the engine is automatically switched off when the driver has braked the vehicle to a standstill. The engine is restarted as soon as the brake pedal is released. Another switch-off logic in automatic vehicles provides that the engine is switched off only approximately 1 second after the standstill state has been attained.

Furthermore, DE 10 2008 061 790 A1 has disclosed an automatic switch-off logic for automatic vehicles with delayed switching in the standstill state, wherein, additionally, a holding function can be activated at the earliest when the standstill state is reached (=a speed of zero is measured).

DE 10 2008 061 791 A1 discloses a similar method, wherein a so-called auto-hold function is activated when the brake pedal is released in the vehicle standstill state, or when the vehicle standstill state is reached, or when an automatic switch-off process is performed.

Furthermore, DE 10 2010 000 615 A1 discloses an automatic switch-off logic for automatic vehicles, wherein the engine is switched off in the event of a predefined speed (e.g. 20 km/h) being undershot. If, over the further course of time, that is to say while the engine is off, a speed of zero is measured (the actual speed may be unequal to zero owing to sensor inaccuracies), brake control with a gradual increase of the braking force is built up in order to hold the standstill state.

It is now an object of the invention to specify a start-stop device which identifies a change in the driver demand with regard to the initiation of an automatic switch-off process of the drive machine and which reacts correspondingly.

The invention is based firstly on the consideration of providing a switch-off logic with the possibility of prevention of an automatic switch-off process in a manner deliberately controlled by the driver. Furthermore, however, after a deliberate prevention of an automatic switch-off process, it should be possible for the driver, in the case of a changed switch-off demand, to be able to nevertheless effect an automatic switch-off process.

Taking account of the above consideration, the invention is directed to a start-stop device for commencing an automatic switch-off process of a drive machine in a motor vehicle, preferably in a motor vehicle with automatic transmission or automated transmission, wherein the start-stop device comprises at least the following means:

means for detecting a first trigger condition for initiating an automatic switch-off process, means for detecting a second trigger condition (with a switch-off logic which differs from the first trigger condition) for initiating an automatic switch-off process if the first trigger condition can no longer be met, and means for initiating an automatic switch-off process of the drive machine if the first trigger condition or the second trigger condition is met.

Here, optionally (in particular in the case of the second trigger condition being met), an automatic switch-off process of the drive machine is also performed if no switch-off prevention criteria imperatively necessary for the operation of the vehicle are present, that is to say certain selectable switch-off prevention criteria may be overruled by the new logic. According to the invention, it is thus advantageously the case that, as a result of the first or in particular a second or further trigger condition being met, the effectiveness of switch-off prevention criteria not imperatively necessary for the operation of the vehicle is suppressed.

The group of switch-off prevention criteria imperatively necessary for the operation of the vehicle advantageously includes only operationally critical and safety-critical switch-off prevention criteria. It is alternatively or additionally also possible for the driver himself or herself to specify (for example for each switch-off logic separately) further imperatively necessary switch-off prevention criteria—in addition to the switch-off prevention criteria imperatively necessary for vehicle operation—by means of a vehicle-internal or vehicle-external interface. Here, it is for example also possible for the driver to still select in advance whether he or she wishes for basically all self-specified imperatively necessary switch-off prevention criteria to be taken into account, or only correspondingly a set of selected self-defined necessary switch-off prevention criteria.

In particular, an automatic switch-off process may for example be triggered, in the case of the first trigger condition being identified, only if no switch-off prevention criteria are present, whereas an automatic switch-off process of the drive machine is triggered, in the case of the second trigger condition being identified, if no switch-off prevention criteria imperatively necessary for the operation of the vehicle are present.

The invention is furthermore based on the consideration of basically providing a switch-off logic and/switch-on logic which is based primarily on the evaluation of the demanded deceleration demand, that is to say at least the automatic switch-off process is triggered taking into account the braking torque initiated or demanded owing to a deceleration demand. For this purpose, in one advantageous refinement, the start-stop device according to the invention may comprise means for detecting a braking torque demanded owing to a deceleration demand, and means for detecting the vehicle speed (v), and the first and/or second trigger condition may be based on the evaluation of at least one of said two detected parameters. Instead of an evaluation of the demanded braking torque, it is also possible for an evaluation of the brake pressure or an evaluation of the position of the brake pedal to be performed.

A deceleration demand is to be understood to mean not only an automatically initiated deceleration demand (for example by means of a driver assistance system which imparts longitudinal control, such as for example a speed regulation system) but in particular also a deceleration demand demanded manually by the driver, which deceleration demand is generated by the driver by means of a corresponding actuation of the brake element. For this purpose, it is for example possible for a brake pedal sensor for detecting the brake pedal actuation to be provided, which brake pedal sensor outputs a corresponding signal in a manner dependent on the actuation angle. The demanded (or triggered) braking torque can be determined taking said signal into account.

A detection of the vehicle speed is possible for example by evaluation of the signals of a vehicle speed sensor. Instead of a single speed sensor for determining the vehicle speed, it is also possible for multiple (e.g. four) individual speed sensors to be installed at the wheels of the vehicle, wherein the vehicle speed is determined from the signals of all of the speed sensors by means of a suitable method.

Taking the two detected parameters (a braking torque demanded owing to a deceleration demand and the vehicle speed) into account, the first trigger condition may advantageously be configured so as to be met if, when the start-stop device is activated, the braking torque demanded owing to the deceleration demand is higher, in particular within a speed-dependent time interval, than a predefined first braking-torque-based switch-off threshold, and the vehicle speed is lower than a predefined speed threshold.

In a particularly advantageous refinement of the invention, it is provided that the automatic switch-off process of the drive machine may be initiated not only when the vehicle standstill state is attained, that is to say when a speed of zero is detected, but even before the vehicle standstill state is attained. In particular, it may be provided that the speed threshold is predefined such that the automatic switch-off process is commenced before the standstill state is attained if the motor vehicle is braked owing to a deceleration demand and the detected vehicle speed of the vehicle is lower than the predefined speed threshold (e.g. 3 km/h), such that the drive machine is switched off approximately when the vehicle standstill state is attained. This has the advantage that the vibration of the engine as it runs down can be concealed in the jerk of the stopping action.

Accordingly, in a particularly advantageous refinement of the start-stop device according to the invention, the first trigger condition is met already before the vehicle standstill state is attained if, when the start-stop device is activated, the braking torque demanded owing to the deceleration demand is higher than a predefined first braking-torque-based switch-off threshold, and the vehicle speed is lower than a predefined positive speed threshold, that is to say a speed threshold greater than zero (e.g. 3 km/h). Furthermore, it is additionally possible for the first trigger condition to be met in the vehicle standstill state if, when the start-stop device is active, the braking torque demanded owing to the deceleration demand is higher, within a predefined first time interval which begins when the vehicle standstill state is attained, than a predefined braking-torque-based switch-off threshold.

With regard to the configuration of the second trigger condition, the following specific refinements are advantageously conceivable, wherein it may basically always be the case that the second trigger condition is only met if the first trigger condition is not met and also can no longer be met and the start-stop device is active (from the outset):

In a first advantageous refinement of the second trigger condition, the latter may be configured so as to be met if, at a time at which the first trigger condition can no longer be met, in the vehicle standstill state, the transmission is shifted into the park position; that is to say, if the automatic switch-off process has initially not been commenced because the driver, through corresponding action, has prevented the automatic switch-off in the range close to standstill and/or in the standstill state, he or she can thereafter initiate the automatic switch-off process by shifting the transmission into the park position.

Alternatively or in addition, the second trigger condition may also be met, that is to say met by the driver, if, at a time at which the first trigger condition can no longer be met, in the vehicle standstill state, the brake pedal is actuated with increased intensity.

An intensified actuation of the brake pedal may occur by evaluation of the braking torque demanded by the actuation of the brake pedal or of the brake pressure or by the evaluation of the position of the brake pedal. Below, only the evaluation of the brake pressure will be referred to, wherein it is basically always also possible for the other parameters which correlate with the initiated and/or demanded brake pressure to be evaluated.

In a particularly advantageous refinement of the invention, the second trigger condition may (also) be met if, at a time at which the first trigger condition can no longer be met, in the vehicle standstill state, the braking torque demanded owing to the deceleration demand (as a result of actuation of the brake pedal) exceeds a predefined second braking-torque-based switch-off threshold which is (significantly) higher than a predefined first braking-torque-based switch-off threshold to be taken into account in the case of the first trigger condition.

To prevent the second trigger condition being inadvertently met because the driver (inadvertently) slowly increases the pressure on the brake pedal in the standstill state, it is also proposed that the second trigger condition be met in the case of an intensified actuation of the brake pedal only if, at a time at which the first trigger condition can no longer be met, in the vehicle standstill state, the braking torque demanded owing to the deceleration demand (as a result of actuation of the brake pedal) exceeds, within a second time interval which begins with intensified actuation of the brake pedal, a predefined second braking-torque-based switch-off threshold which is (significantly) higher than a predefined first braking-torque-based switch-off threshold to be taken into account in the case of the first trigger condition.

With regard to the configuration of the level of the second braking-torque-based switch-off threshold, the following refinements are conceivable:

In a first, simple variant, the predefined second braking-torque-based switch-off threshold may always be formed from the braking torque demanded on the basis of the deceleration demand before intensified actuation of the brake pedal and from an offset braking torque, which is at least so high that the second braking-torque-based switch-off threshold is not met as a result of an "incidental" more intense actuation of the brake pedal. Ideally, the offset amounts to more than 1000 Nm, in particular more than 1500 Nm, and less than 3000 Nm, in particular less than 2500 Nm. Tests have shown that an offset of approximately 1800 Nm appears to be particularly advantageous.

As an alternative to the above specification of the second braking-torque-based switch-off threshold, it is also possible for differentiation on a case-by-case basis to be performed for the specification of the level. If the braking torque demanded owing to the (original) deceleration demand before the intensified actuation of the brake pedal is higher than the predefined first braking-torque-based switch-off threshold (because the driver, for example at a time at which the first trigger condition was no longer able to be met, has increased the pressure on the brake pedal to such an extent that the demanded braking torque is higher than the first braking-torque-based switch-off threshold, which is no longer effective at said point in time), the predefined second braking-torque-based switch-off threshold may be formed from the braking torque demanded owing to the deceleration demand before the intensified actuation of the brake pedal and from an offset braking torque (e.g. 1800 Nm). However, if the braking torque demanded before the intensified actuation of the brake pedal is lower than the predefined first braking-torque-based switch-off threshold, then the predefined second braking-torque-based switch-off threshold may be formed from the predefined first braking-torque-based switch-off threshold and an offset braking torque (e.g. 1800 Nm).

Since the first and second trigger conditions discussed above can be met only if the start-stop device in question is activated (from the outset), the start-stop device according to the invention may, in a further advantageous refinement, also comprise the following means:
- means for detecting a third trigger condition for initiating an automatic switch-off process, and
- means for initiating an automatic switch-off process of the drive machine if the third trigger condition is met.

Here, the third trigger condition may be met if, after initial manual deactivation of the start-stop device, said start-stop device is manually activated in the vehicle standstill state (in particular after it is no longer possible for the first trigger condition to be met), that is to say the driver may bring about an automatic switch-off process of the drive machine by means of an activation of the start-stop device in the vehicle standstill state. For the sake of completeness, it is pointed out here that a triggering of an automatic switch-off process of the drive machine by means of a manual activation of the previously deactivated start-stop device is to be understood as an independent concept independently of the above statements relating to the invention. The applicant reserves the right to pursue this inventive concept in a separate patent application.

It is advantageously possible—analogously to the second trigger condition—for said third trigger condition to also be configured such that, in the case of manual activation of the start-stop device in the vehicle standstill state (after initial deactivation), an automatic switch-off process is also commenced if possibly predefined switch-off prevention criteria or predefined switch-off prevention conditions are met. In particular, the automatic switch-off process may be commenced only if no safety-critical and/or operationally critical switch-off prevention criteria are present or met. If only comfort-oriented switch-off prevention criteria are met, it is nevertheless possible for an automatic switch-off process to be commenced, because, owing to the manual activation, it is suggested that the driver seeks a switch-off of the drive machine regardless of comfort. In the context of comfort-oriented switch-off prevention criteria, it is thus possible, for example, for switch-off prevention criteria which are present owing to the demand for air conditioning and/or owing to the present steer angle (too large) and/or owing to an identified stop-and-go traffic situation to be overruled.

Other objects, advantages and novel features of the present invention will become apparent from the following detailed description of one or more preferred embodiments when considered in conjunction with the accompanying drawings.

BRIEF DESCRIPTION OF THE DRAWINGS

The invention will now be discussed in more detail on the basis of an exemplary embodiment, in which.

DETAILED DESCRIPTION OF THE DRAWINGS

Figure 1:
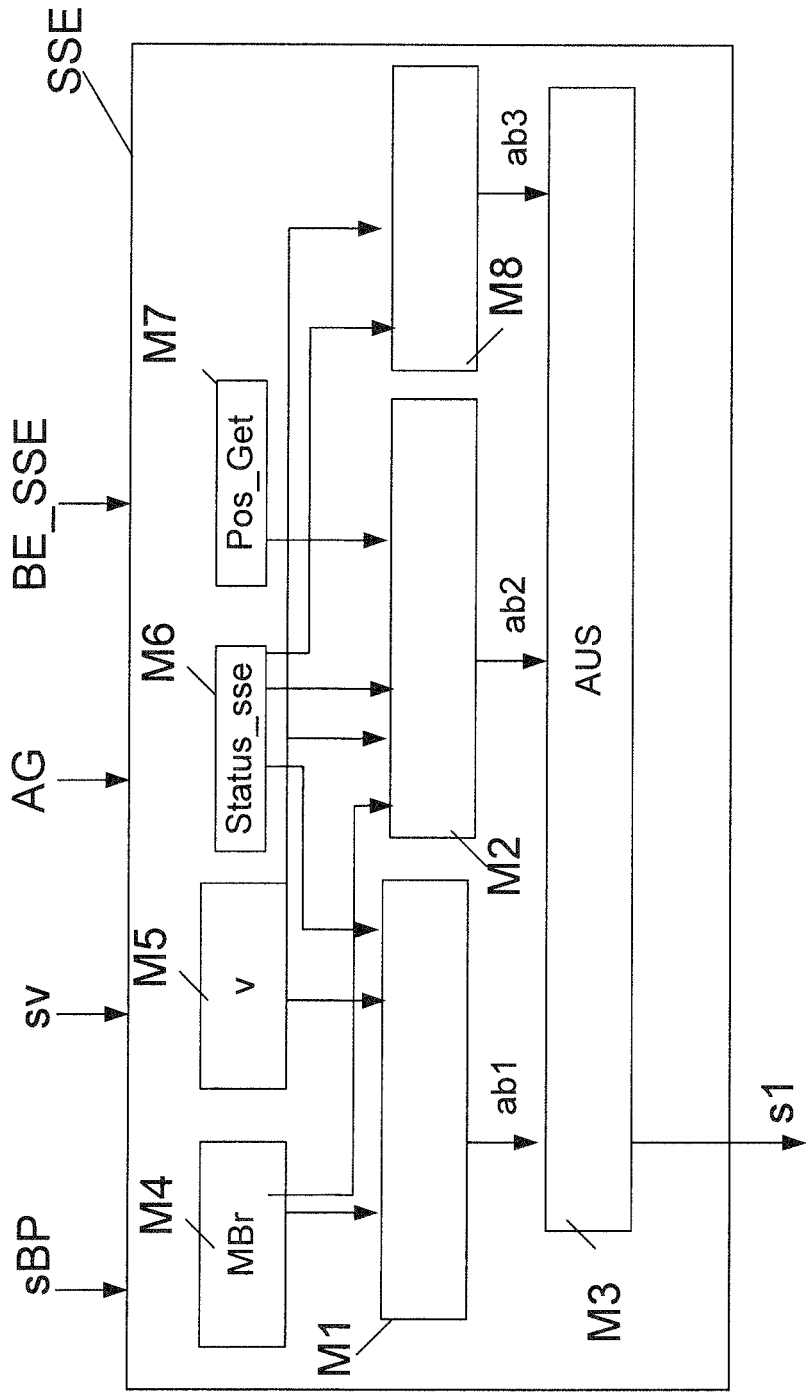
FIG. 1 is a detailed illustration of a start-stop device according to the invention.

FIG. 1 shows a detailed illustration of a start-stop device SSE according to the invention for commencing an automatic switch-off process of a drive machine in the form of an internal combustion engine in a motor vehicle with automatic transmission, to which start-stop device various input signals sBP, sv, AG and BE-SSE are fed and correspondingly taken into account.

In particular, the start-stop device SSE comprises the following means:
- means M1 for detecting a first trigger condition for initiating an automatic switch-off process,
- means M2 for detecting a second trigger condition for initiating an automatic switch-off process if the first trigger condition can no longer be met.
- means M8 for detecting a third trigger condition, and
- means M3 for initiating an automatic switch-off process of the drive machine (s1) if the first trigger condition ab1 or the second trigger condition ab3 or the third trigger condition ab3 is met.

To be able to detect whether one of the three trigger conditions is met, the following means are additionally provided:
- means M4 for detecting a braking torque MBr demanded owing to an actuation of the brake pedal (which is detected by means of a brake pedal sensor and transmitted as a signal sBP to the start-stop device SSE), means M5 for detecting the vehicle speed v from the signal sv transmitted from at least one wheel rotational speed sensor, means M6 for detecting the present operating state Status_sse of the start-stop device SSE from a signal BE_SSE transmitted from an actuation element for the temporary activation or deactivation of the start-stop device, and means M7 for detecting the transmission position or the change in the transmission position Pos_Get from the signal AG transmitted from the automatic transmission.

Specifically, the means M1 is designed so as to detect a first trigger condition, and thereupon output a signal ab1 to the means M3 for commencing an automatic switch-off process of the drive machine, if, before the vehicle standstill state is reached, that is to say when v>0, when the start-stop device is activated, the braking torque demanded owing to the deceleration demand is higher than a predefined first braking-torque-based switch-off threshold, and the vehicle speed is lower than a predefined "positive" speed threshold of for example 3 km/h, or if, in the vehicle standstill state (v=0), when the start-stop device is active, the braking torque demanded owing to the deceleration demand is higher, in particular within a predefined first time interval which begins when the vehicle standstill state is attained, than a predefined first braking-torque-based switch-off threshold.

If the first trigger condition can no longer be met, for example because the vehicle standstill state has been attained and the first time interval has elapsed without the predefined first braking-torque-based switch-off threshold being exceeded, the second means M2 for detecting the second trigger condition is activated. Said second means M2 is specifically designed such that the second trigger condition is detected, and a signal ab2 is thereupon transmitted to the means M3 for commencing an automatic switch-off process of the drive machine, if, when the start-stop device is active, in the vehicle standstill state (v=0), the transmission is shifted into the park position, or if, when the start-stop device is active, in the vehicle standstill state (v=0), the brake pedal is actuated with increased intensity, in particular such that the braking torque demanded owing to the actuation of the brake pedal exceeds a predefined second braking-torque-based switch-off threshold which is higher than the predefined first braking-torque-based switch-off threshold to be taken into account in the case of the first trigger condition, wherein the level of the second braking-torque-based switch-off threshold may be formed from the braking torque demanded before the intensified actuation by the brake pedal and from an offset value. Ideally, the exceedance of the second braking-torque-based switch-off threshold must occur within a second time interval which begins with the intensified actuation of the brake pedal, in order to be able to derive a switch-off demand therefrom.

In this exemplary embodiment, in the case of the first trigger condition being met, an automatic switch-off process is initiated only if no switch-off prevention criteria are present. By contrast, in the case of the second trigger condition being met, an automatic switch-off process is initiated if no safety-critical or operationally critical switch-off prevention criteria necessary for the operation of the vehicle are present.

If it is identified that the start-stop device has initially been deactivated by the driver, it is (proceeding from the point at which the vehicle standstill state is attained) detected by the means M8 whether the third trigger condition is met. Said third trigger condition is considered to be met if the start-stop device, in the vehicle standstill state, is reactivated by means of a corresponding operator control action and no safety-critical or operationally critical switch-off prevention criteria are present. Non-safety-critical and operationally non-critical switch-off prevention criteria (for example air-conditioning-system-based switch-off prevention criteria present owing to a demand for air conditioning or steer-angle-based switch-off prevention criteria present owing to the present steer angle or traffic-situation-based switch-off prevention criteria present owing to the traffic situation (for example traffic congestion)) may be overridden.

By means of such a construction of a start-stop device SSE, it can be ensured that a switch-off process can be commenced even after a switch-off demand of the driver that has arisen only at a relatively late point in time.

Figure 2:
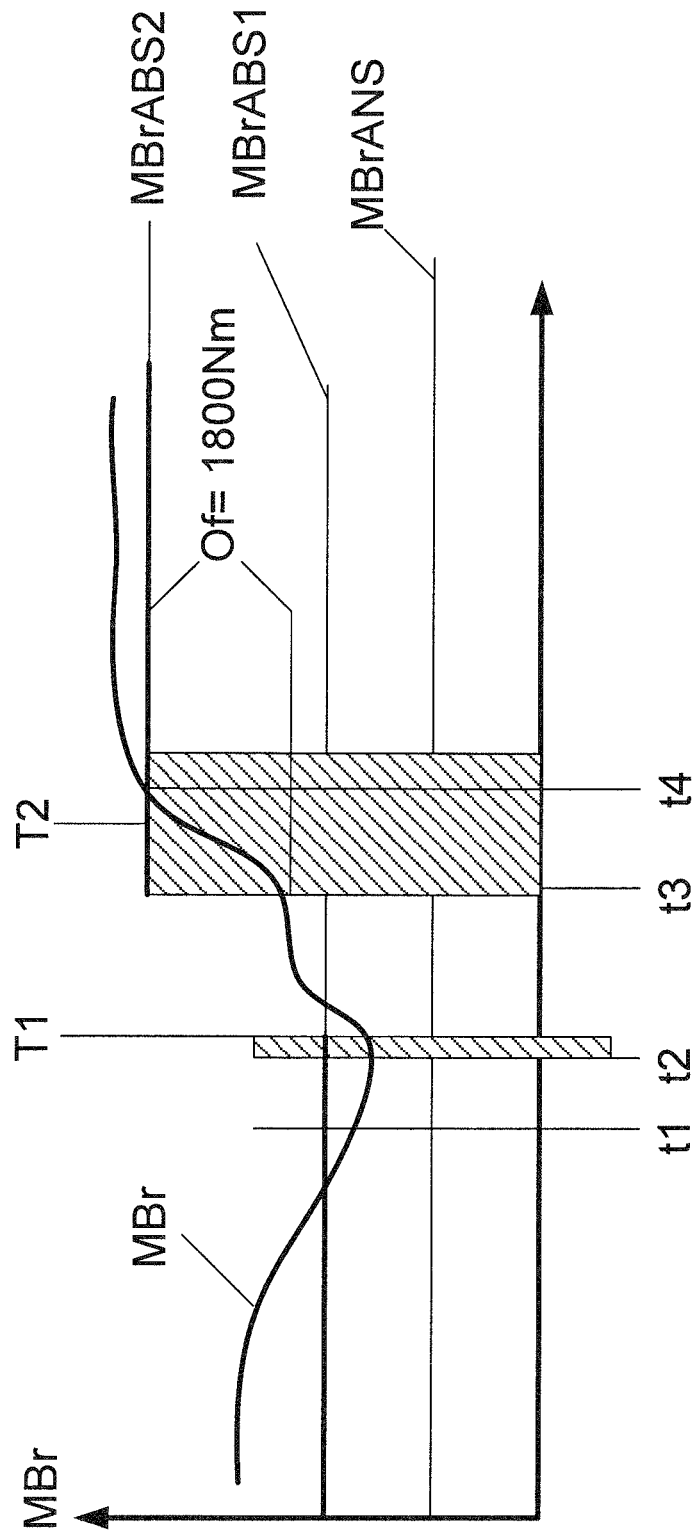
FIG. 2 shows a braking torque profile for illustrating the trigger time of an automatic switch-off process of a drive machine.

FIG. 2 shows a profile of the braking torque MBr demanded through actuation of the brake pedal.

It is basically the case that a braking-torque-based switch-on threshold MBrANS relevant for the commencement of an automatic switch-on process always lies below the braking-torque-based switch-off threshold MBrABS1 applicable to a first trigger condition and below the (variable) braking-torque-based switch-off threshold MBrABS2 applicable to a second trigger condition, wherein the second switch-off threshold MBrABS2 is always higher than the first braking-torque-based switch-off threshold MBrABS1.

Firstly, the driver begins a process of braking the vehicle by actuating the brake pedal, whereby a braking torque MBr is demanded which is higher than the presently applicable first braking-torque-based switch-off threshold MBrABS1. At the time t1, the vehicle speed falls below the speed threshold of 3 km/h necessary for the first trigger condition. Since it is however the case that, proceeding from said time t1, the braking torque MBr imparted by means of the brake pedal is no longer higher than the first braking-torque-based switch-off threshold MBrABS1, no automatic switch-off process is commenced.

Proceeding from the time t2, the vehicle standstill state has been attained, such that an automatic switch-off process in the case of the predefined first braking-torque-based switch-off threshold MBrABS1 being undershot would be possible only for a predefined first time interval T1 which begins when the vehicle standstill state is reached. Since said threshold MBr1 is not (or no longer) exceeded within the first time interval T1, the first trigger condition can no longer be met. Thus, proceeding from said time (end of the first time interval T1), the applicable braking-torque-based switch-off threshold is no longer the first braking-torque-based switch-off threshold MBrABS1 but the second braking-torque-based switch-off threshold MBrABS2.

Proceeding from the time t3, an intensified actuation of the brake pedal is then identified. Proceeding from said time, the level of the second braking-torque-based switch-off threshold MBrABS2 is formed by applying an offset braking torque Of of 1800 Nm to the presently prevailing braking torque (before the intensified actuation). Since it is then the case that, within the second time window T2 which begins with the intensified actuation of the brake pedal, the driver exceeds said higher second braking-torque-based switch-off threshold MBrABS2 at the time t4, the automatic switch-off process is commenced at said time t4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A start-stop device for commencing an automatic switch-off process of a drive machine in a motor vehicle comprises:
    one or more sensors that detect a first trigger condition for initiating an automatic switch-off process;
    one or more sensors that detect a second trigger condition for initiating the automatic switch-off process, wherein the one or more sensors that detect the second trigger condition are activated to detect the second trigger condition in response to a detection that the first trigger condition cannot be met; and
    means for initiating an automatic switch-off process of the drive machine in response to a detection that the first trigger condition is met, and for initiating the automatic switch-off process in response to a detection that the second trigger condition is met.

2. The start-stop device as claimed in claim 1, wherein, as a result of the first or second trigger conditions being met, an effectiveness of switch-off prevention criteria not imperatively necessary for operation of the motor vehicle is suppressed.

3. The start-stop device as claimed in claim 1, wherein the first trigger condition is met if, when the start-stop device is activated, a braking torque demanded owing to a deceleration demand is higher than a predefined first braking-torque-based switch-off threshold, and a vehicle speed is lower than a predefined speed threshold.

4. The start-stop device as claimed in claim 2, wherein the first trigger condition is met if, when the start-stop device is activated, a braking torque demanded owing to a deceleration demand is higher than a predefined first braking-torque-based switch-off threshold, and a vehicle speed is lower than a predefined speed threshold.

5. The start-stop device as claimed in claim 1, wherein the first trigger condition is met before a vehicle standstill state is attained if, when the start-stop device is activated, a braking torque demanded owing to a deceleration demand is higher than a predefined first braking-torque-based switch-off threshold, and a vehicle speed is lower than a predefined positive speed threshold.

6. The start-stop device as claimed in claim 2, wherein the first trigger condition is met before a vehicle standstill state is attained if, when the start-stop device is activated, a braking torque demanded owing to a deceleration demand is higher than a predefined first braking-torque-based switch-off threshold, and a vehicle speed is lower than a predefined positive speed threshold.

7. The start-stop device as claimed in claim 1, wherein the first trigger condition is met in a vehicle standstill state if, when the start-stop device is active, a braking torque demanded owing to a deceleration demand is higher, within a predefined first time interval which begins when a vehicle standstill state is attained, than a predefined first braking-torque-based switch-off threshold.

8. The start-stop device as claimed in claim 1, wherein the second trigger condition is met if, in a vehicle standstill state, a vehicle transmission is shifted into a park position.

9. The start-stop device as claimed in claim 1, wherein the second trigger condition is met if, in a vehicle standstill state, a brake pedal is actuated with increased intensity.

10. The start-stop device as claimed in claim 1, wherein the second trigger condition is met if, in a vehicle standstill state, a braking torque demanded owing to actuation of a brake pedal exceeds a predefined second braking-torque-based switch-off threshold which is higher than a predefined first braking-torque-based switch-off threshold to be taken into account in the case of the first trigger condition.

11. The start-stop device as claimed in claim 1, wherein the second trigger condition is met if, in a vehicle standstill state, a braking torque demanded owing to actuation of a brake pedal exceeds, within a second time interval which begins with intensified actuation of a brake pedal, a predefined second braking-torque-based switch-off threshold which is higher than a predefined first braking-torque-based switch-off threshold to be taken into account in the case of the first trigger condition.

12. The start-stop device as claimed in claim 10, wherein, if a braking torque demanded on the basis of a deceleration demand before intensified actuation of a brake pedal is higher than the predefined first braking-torque-based switch-off threshold, the predefined second braking-torque-based switch-off threshold is formed from the braking torque demanded on the basis of the deceleration demand before intensified actuation of the brake pedal and from an offset braking torque.

13. The start-stop device as claimed in claim 10, wherein, if a braking torque demanded on the basis of a deceleration demand before intensified actuation of a brake pedal is not higher than the predefined first braking-torque-based switch-off threshold, the predefined second braking-torque-based switch-off threshold is formed from the predefined first braking-torque-based switch-off threshold and an offset braking torque.

14. The start-stop device as claimed in claim 1, further comprising:
    one or more sensors that detect a third trigger condition for initiating an automatic switch-off process, and
    means for initiating an automatic switch-off process of the drive machine if the third trigger condition is met.

15. The start-stop device as claimed in claim 14, wherein the third trigger condition is met if, after initial manual deactivation of the start-stop device, said start-stop device is manually activated in a vehicle standstill state where no safety-relevant or operationally-critical switch-off prevention criterion is met.

16. A method for commencing an automatic switch-off process of a drive machine in a motor vehicle, the method comprising:
    detecting whether a first trigger condition for initiating an automatic switch-off process can be met;
    in response to detecting that the first trigger condition can be met:
        detecting that the first trigger condition is met, and
        initiating the automatic switch-off process in response to detecting that the first trigger condition is met; and
    in response to detecting that the first trigger condition cannot be met:
        detecting that a second trigger condition for initiating the automatic switch-off process is met, and
        initiating the automatic switch-off process in response to detecting that the second trigger condition is met.

17. The method as claimed in claim 16, further comprising suppressing an effectiveness of switch-off prevention criteria not imperatively necessary for operation of the motor vehicle in response to the first or second trigger conditions being met.

\* \* \* \* \*